Dec. 16, 1924.
D. M. WEIGEL
1,519,522
METHOD AND APPARATUS FOR MAKING PNEUMATIC TIRE FABRICS
Filed Jan. 13, 1921
2 Sheets-Sheet 1
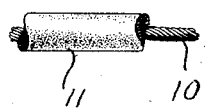
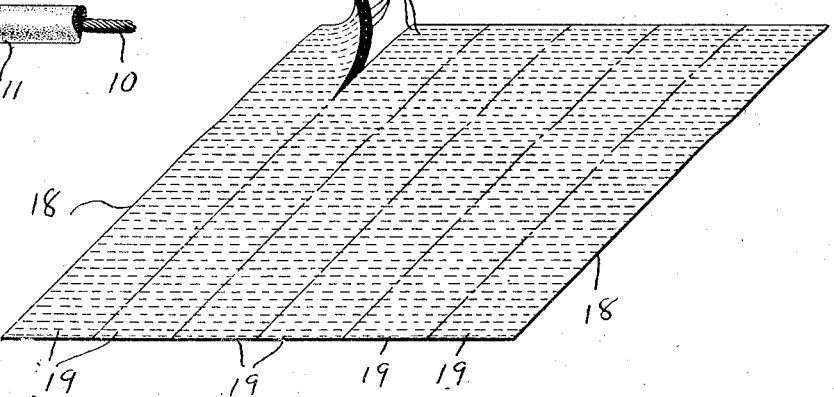
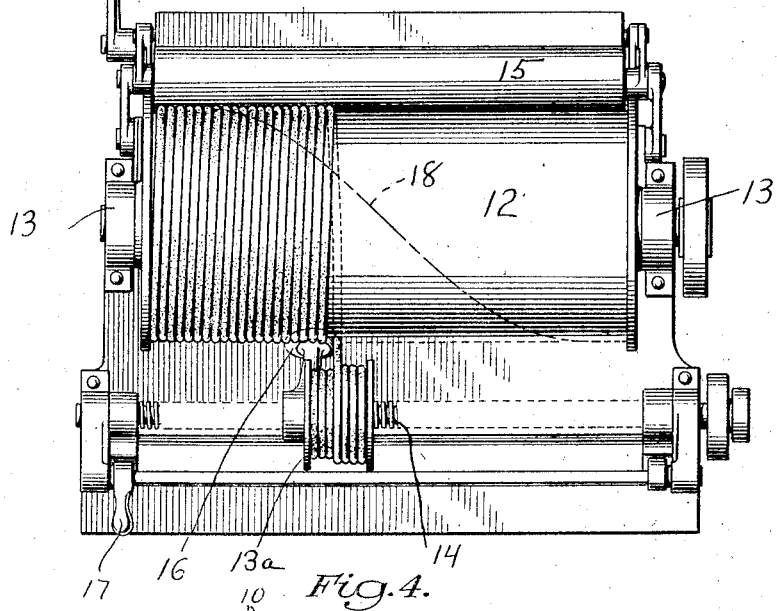

Dec. 16, 1924.  
D. M. WEIGEL  
1,519,522  
METHOD AND APPARATUS FOR MAKING PNEUMATIC TIRE FABRICS  
Filed Jan. 13, 1921  2 Sheets-Sheet 2
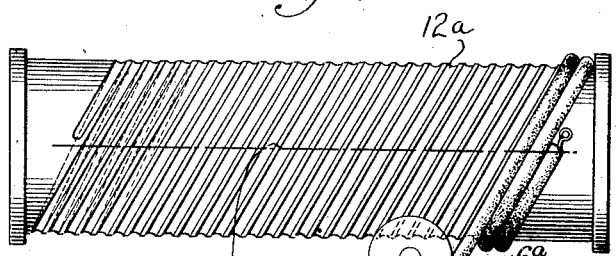
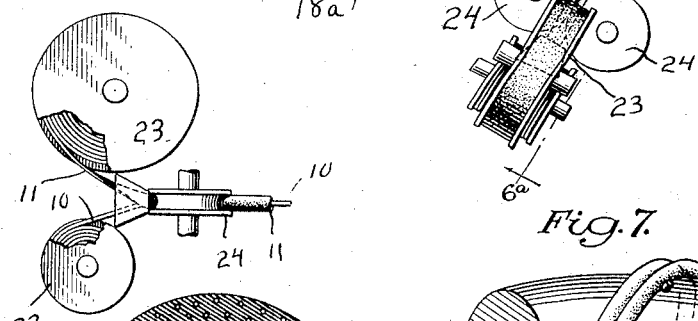
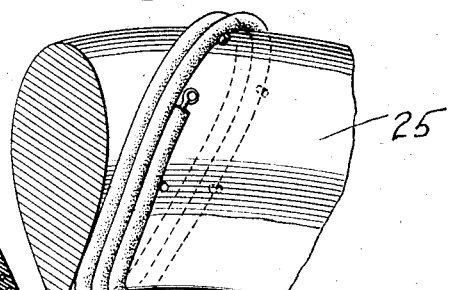
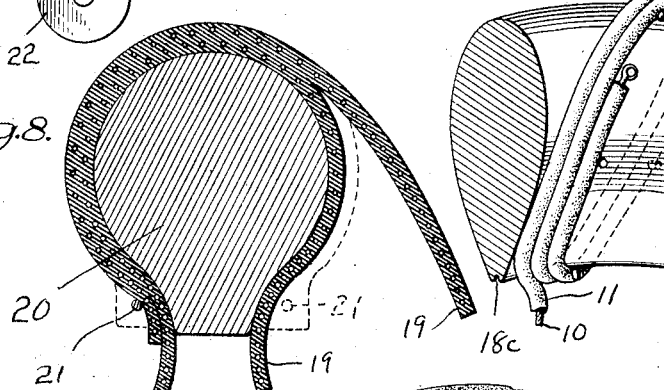
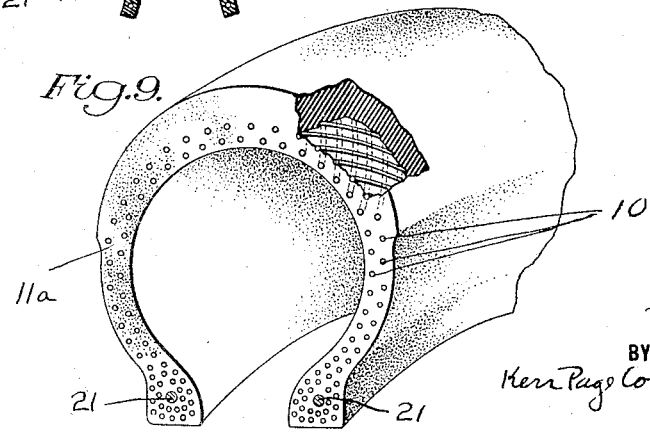
INVENTOR  
D. M. Weigel  
BY  
Kerr Page Cooper & Hayward  
ATTORNEYS Patented Dec. 16, 1924.

1,519,522

UNITED STATES PATENT OFFICE.

DANIEL MICHEL WEIGEL, OF LONDON, ENGLAND, ASSIGNOR, BY MESNE ASSIGNMENTS, TO THE AMERICAN WIRE CORD TIRE COMPANY, OF WILMINGTON, DELAWARE, A CORPORATION OF DELAWARE.

METHOD AND APPARATUS FOR MAKING PNEUMATIC-TIRE FABRICS.

Application filed January 13, 1921. Serial No. 436,899.

*To all whom it may concern:*

Be it known that I, DANIEL MICHEL WEIGEL, a subject of Great Britain, residing at London, England, have invented certain new and useful Improvements in Methods and Apparatus for Making Pneumatic-Tire Fabrics, of which the following is a full, clear, and exact description.

I would refer to two prior applications made by me, respectively No. 367,087, dated March 19, 1920, and No. 376,104, dated April 23, 1920.

The former refers to a pneumatic tire casing, the special features of which are that it is made without vegetable fibre; it is of rubber only; and embedded in such rubber, to prevent the said casing from stretching are independent flexible wires diagonally disposed. There may be a plurality of layers of wires, one layer disposed above the other and crossing it in the opposite diagonal. These flexible wires are anchored to the beads and thus take the load. They are also sufficiently close together (yet apart) to prevent the rubber between them from being blown out by the pressure of air within. No wire touches another, and each is separated by rubber, hence the casing as a whole is non-integral and non-rigid and each wire can articulate independently of the other, thus forming a very strong and flexible casing with the least amount of energy losses.

Application No. 376,104 refers to a fabric of rubber and flexible wire and methods of making same to be of service in building the tire referred to in application No. 367,087, and permits of large sheets of this fabric (so called for the purposes hereof) being manufactured, and strips equal in length and breadth of any tire circumference and width being cut off, and thus permit any size tire being constructed with a single strip of this fabric, and thereby allow hundreds of wires being easily handled, easily adjusted upon a core and assuring the wires falling into their proper equidistant places.

In such application, the methods shown are to wrap a bare single strand of flexible wire over a sheet of vulcanizable rubber, and place a second sheet above such wire and roll the two sheets together so that they adhere between the wires, filling the spaces and locking the wires in place. The sheet is then cut and removed, leaving a flat sheet with a plurality of independent wires running on a bias to the edge of the rubber.

The object of the present invention is, amongst other things, an improved method of manufacturing sheets of fabric referred to in application No. 376,104, and primarily to employ a flexible wire that is coated or wrapped with rubber before forming it into sheets.

Another object is to wrap or coat the flexible wire with the proper thickness of rubber to fix the distance between the wires to any required distance and prior to forming them into sheets, so that the distance between the wires shall be equidistant and the rubber compact between the wires and with any required thickness of rubber above and below the wires.

Another object is to so construct the sheets to permit the wires being parallel to each other, parallel to one edge of the rubber, and on the bias to the other edge of the rubber and thereby prevent waste.

Fig. 1 shows a flexible wire strand, preferably twisted steel wire strands, or twisted steel wire cords, encased in rubber.

Fig. 2 shows a sheet of rubber with flexible wire strands embedded in it, the wires parallel to each other, parallel to one edge; on the bias to the other. The dotted lines separate the wires, and the dashed lines show how the strips can be cut off.

Fig. 3 shows means for making the sheets on a revolving drum from a single strand of flexible wire coated with rubber.

Fig. 4 shows a section of the fabric prior to rolling or flattening the rubber to compact form.

Fig. 5 shows a section after rolling to compact form.

Fig. 6 shows a grooved revolving drum to permit of the coated wire being wrapped upon it on a bias or angle and cut parallel with the drum.

Fig. 6$^a$ shows a detail taken on line 6$^a$—6$^a$ of Fig. 6 and showing a means for coating the rubber on the wire.

Fig. 7 shows a method of wrapping the rubber coated wire directly on to a tire core and cutting underneath and on the interior of the core and thus immediately making it to shape and ready to anchor to the beads.

Fig. 8 shows a section of a tire core with successive strips of fabric being placed upon it, ready for the next forming operation.

Fig. 9 shows a perspective view of a tire casing cut to show the wires in place.

In carrying out the present method various instrumentalities may be used. In one embodiment of the invention I provide a flexible wire 10 (Fig. 1) coated with soft plastic rubber 11 and successively wrap convolutions of the coated wire about a form such as a revolving drum. In Fig. 3 I have illustrated one means of carrying out this step of the method. I provide a suitable drum 12 mounted on bearings 13 and rotated by suitable means not shown. As the drum rotates the coated wire 10—11 is lead off a supply roll 13 which is rotatable and provided with a suitable tension device. As the coated wire is led off the supply roll it is advanced laterally by means of lead screw 14 to space the convolutions adjacent one another on the drum, as shown in Figs. 3 and 4. The convolutions are preferably uniformly spaced thereon. The wire is wound upon the drum until the desired width is secured thereon. Then the end of the coated wire is cut off and secured either by tacking the end to the adjacent sticky coated wire, or it may be temporarily held by a suitable pin or clamp upon the drum.

The next step consists in compacting and flattening the tubular rubber sections into sheet form. This may be effected by such means as the presser roll 15. This step being completed the rubber takes the form of a sheet wrapped about the drum and having a cross section such as is shown in Fig. 5. The rubber is now homogeneous and the integral sheet contains a plurality of wires each properly spaced from adjacent wires. The thickness of the sheet may be controlled by regulating the distance between the presser roll and the periphery of the drum.

The next step comprises the slitting or cutting of the sheet to permit the removal of the material from the drum. This cutting is effected at a predetermined pitch angle in order to throw the wires on a bias to one edge of the rubber sheet. This cutting may be effected in any desired manner as by a cutter wheel 16 which can be advanced into cutting position by means of a handle 17 and thereafter fed laterally by lead screw 14. During the cutting the drum is rotated with the result that the cut is made along the pitched line 18 as shown in Fig. 3.

The sheet is then removed from the drum and appears as shown in Fig. 2. In this figure, the dotted lines represent the wires 10 which are on a bias to the edge 18 of the sheet. The dot and dashed lines show how the sheet may be further sub-divided into strips 19 for use in the next step of tire biulding. Fig. 8 shows one of the tire operations. Here two of the strips 19 which are cut from the sheet are applied over a core 20. One strip is reversed relatively to the other, whereby the wires of one layer may extend in crossing directions relatively to those of the adjacent layer. The strips are united by rolling and pressing and the rubber being plastic permits the wires to approach each other and form around the smaller circumference of the core without disturbing the original spacing of the wires upon the periphery. It will be understood that all of the wires are diagonal to the beads 21.

Fig. 7 illustrates a modified manner of carrying out my method for forming the fabric or sheet. I here employ a grooved drum 12ª and roll thereon convolutions of rubber covered wire. The convolutions are disposed at an angle to the axis so that the bias arrangement of wires can be obtained by cutting a single horizontal cut as shown at 18ª.

Fig. 6ª, and 6 also, illustrate one instrumentality for coating the wire with rubber. The wire 10 is advanced from roll 22 and the rubber 11 in the form of a long strip is drawn from roll 23. The rubber and wire then pass through the forming rolls 24 as best shown in Fig. 6. It will be understood that such an arrangement for coating the wire may also be employed in connection with the method heretofore described in connection with Fig. 3, and hereafter described in connection with Fig. 7.

Fig. 7 illustrates another way of forming a tire carcass with rubber coated wire. Here I employ a mandrel or core 25 shaped to conform substantially to the general configuration of a tire core. The coated wires 10, 11, are successively wrapped around this core at an angle thereto and diagonally as shown, and after being compacted and flattened the rubber and wires are cut at 18ᶜ thereby forming a strip shaped to conform to the tire core and having wires on a bias to the longitudinal edge 18ᶜ thereof. These strips may then be used to form the carcass of the tire in the manner heretofore described, or beads 21 may be directly applied and additional convolutions may be wound upon the first formed layer of rubber and wire. The carcass being completed, additional tread rubber may be applied and the whole vulcanized in any desired way. Fig. 9 shows the completed tire. This comprises a homogeneous rubber casing 11ª made up in part of the rubber coating 11 of the coated wires and in part of the rubber tread portion. 10 are the wires one layer superimposed upon the other and spaced therefrom by the rubber and running on a bias to the beads 21, to which they are anchored. Each layer of wires extends in an opposite direction to the wires of the other layer.

Where the tire is shown cut the dotted lines represent the under ply of wires and the full lines the upper ply, and these are separated by rubber. This cut in the tire is shown to explain the way the wires cross, each separated from each, each ply separated from each and rubber compact between all the wires. The wires are thus independent and each is able to move in the plastic and elastic mass of rubber, unhampered by any relationship to the necessary deflections and depressions caused by contact with the road and obstacles and unhampered by cotton fabric or like integral material. The wires are anchored to beads 21 and take the whole load and the wires being close enough together and the spaces filled with rubber the air within is confined at the necessary required pressure. The whole comprises a non-integral and non-rigid mass, yet able to withstand the air pressure from within; and due to this non-rigidity and the plastic and elastic nature of the rubber will deflect and depress in all directions without gaping or crimping or tucking. After vulcanizing there are no layers and the whole comprises an homogeneous mass, and the wires are unable to cut their way out as they can when placed between layers of flexible but not elastic material.

What I claim is:—

1. The method of making a fabric for tires which consists in winding successive convolutions of rubber coated flexible wires about a form, thereafter compacting and flattening the rubber to form the rubber into a homogeneous mass with the wires embedded therein and spaced from each other and entirely within the rubber mass, and thereafter so cutting the rubber and the wires as to obtain a sheet having the wires extending on a bias to the edge thereof.

2. The method of making a fabric for tires which consists in winding successive and uniformly spaced convolutions of a rubber coated continuous wire about a suitable form, thereafter compacting and uniting the rubber of adjacent convolutions to form an integral mass of rubber with uniformly spaced wires embedded therein and spaced by the rubber from the outer surface thereof, thereafter cutting the mass of rubber and the wires transversely thereto at such an angle to the longitudinal axis of the wires as to form a sheet having wires therein disposed on a bias to the edges thereof.

3. The method of making a rubber and wire fabric, which consists in winding successive convolutions of a soft unvulcanized rubber coated flexible wire about a drum, thereafter compacting the rubber to unite adjacent convolutions of the rubber to each other and to flatten the same to a desired thickness into an integral sheet with embedded wires spaced from each other and from the surface thereof, thereafter cutting the rubber and wires on a line pitched relatively to the drum whereby the several wires are disposed upon a bias relatively to said line of cut, and thereafter removing the sheet from the drum.

4. The invention set forth in claim 3 in which the sheet is subdivided into strips by cutting the same longitudinally to the wires embedded therein.

5. The method of making a rubber and wire sheet having the wires therein substantially uniformly spaced and embedded in the rubber and disposed on a bias to the edge thereof which consists in coating a flexible wire with soft unvulcanized rubber, winding the coated flexible wire upon a drum and disposing the successive convolutions thereof side by side thereon, then compacting and uniting the rubber of the adjacent convolutions and during compacting, maintaining the wires spaced from each other and from the surface of the rubber, then cutting the rubber and wires transversely and at an angle to the longitudinal axis of the wires, and then removing the completed sheet from the drum.

6. A machine for making a rubber and wire fabric, comprising in combination, a revoluble drum, means for applying successive convolutions of rubber coated flexible wire thereto, means for rolling the convolutions of rubber coated wire to compact the same into a homogeneous mass and means for cutting the rubber and wire on a pitched line on the drum periphery for the purpose described.

7. The invention set forth in claim 6 in which means is provided for feeding the coated wire transversely to the drum as the convolutions are applied thereto, whereby the wires are uniformly spaced apart in the rubber when the same is compacted and united.

In testimony whereof I hereto affix my signature.

DANIEL MICHEL WEIGEL.